Sept. 15, 1925.
C. R. TROTTER
AIR BRAKE
Filed Jan. 31, 1924
1,553,966
2 Sheets-Sheet 1
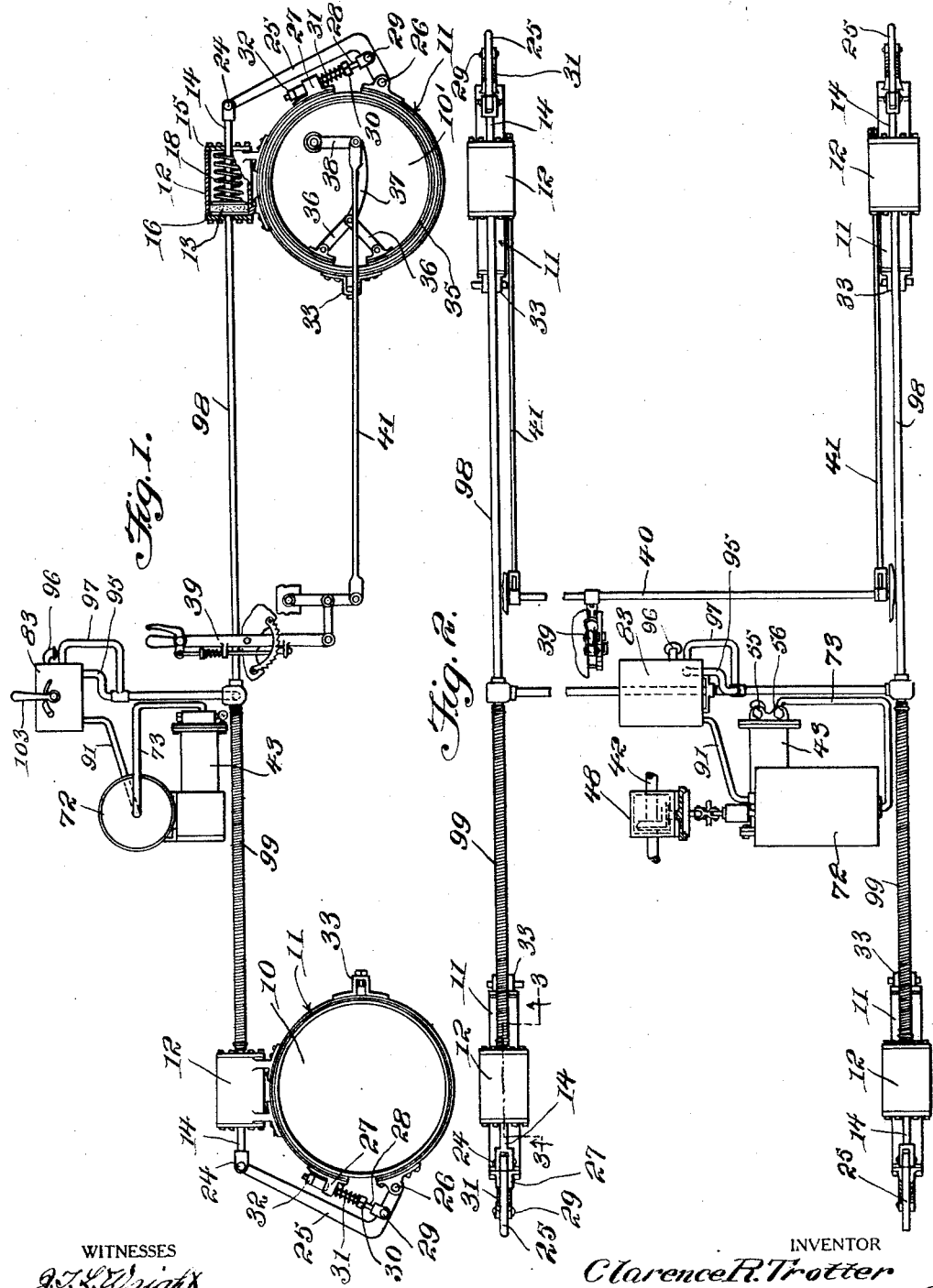
WITNESSES
INVENTOR
Clarence R. Trotter
BY
ATTORNEYS

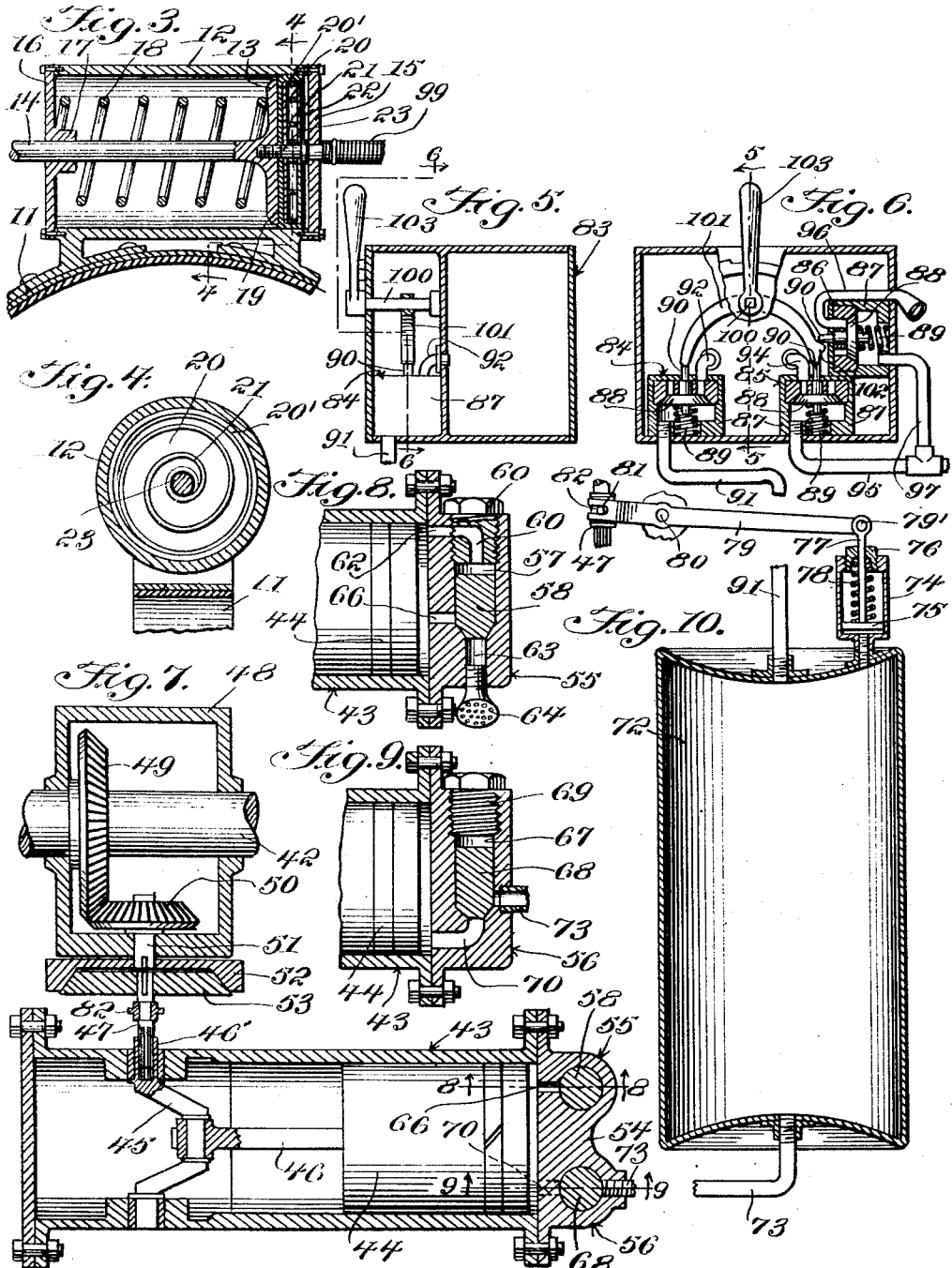

Patented Sept. 15, 1925.

1,553,966

UNITED STATES PATENT OFFICE.

CLARENCE ROSS TROTTER, OF KNOXVILLE, TENNESSEE.

AIR BRAKE.

Application filed January 31, 1924. Serial No. 689,766.

*To all whom it may concern:*

Be it known that I, CLARENCE ROSS TROTTER, a citizen of the United States, and a resident of Knoxville, in the county of Knox and State of Tennessee, have invented certain new and useful Improvements in Air Brakes, of which the following is a specification.

This invention relates to air brakes and has for its object the provision of a device for a four wheel brake for automobiles.

Another object of the invention is the provision of a brake cylinder to each brake drum thus eliminating the complicated mechanical action of the mechanical four wheel brake, also the mechanical action of the hydraulic four wheel brake.

A further object is to provide a substantial, advantageous and economical air brake which can be used for general brake purposes.

This invention will be best understood from a consideration of the following detailed description, in view of the accompanying drawings forming a part of the specification, nevertheless it is to be understood that the invention is not confined to the disclosure, being susceptible of such changes and modifications which shall define no material departure from the salient features of the invention expressed in the appended claims.

In the drawings:

Figure 1 is a view in side elevation illustrating the present invention applied to a motor vehicle, the brake drums of the motor vehicle only being shown in order to more clearly illustrate the different parts of this invention, Figure 2 is a top plan view of the same, Figure 3 is a longitudinal sectional view of a brake cylinder taken substantially on line 3—3 of Figure 2, Figure 4 is a sectional view taken substantially on the line 4—4 of Figure 3, Figure 5 is a sectional view taken substantially on the line 5—5 of Figure 6, Figure 6 is a sectional view taken substantially on the line 6—6 of Figure 5, Figure 7 is a longitudinal sectional view of the air compressor unit, and also showing the connection of said unit to crank shaft of the associated motor vehicle, Figures 8 and 9 are fragmentary sectional views taken on the lines 8—8 and 9—9 respectively of Figure 7, and Figure 10 is a longitudinal sectional view of the main air reservoir or tank.

Referring to the drawings more particularly in Figures 1, 2 and 3, 10 indicates generally a brake drum for a front wheel of the motor vehicle to which the invention is applied, and 10' a brake drum of a rear wheel. The same structure of air brake is used for both front and rear wheels. Each brake drum has fitted thereabout a brake band 11 which may be of conventional construction. Upon each brake band 11 there is mounted a cylinder 12. As best shown in Figure 3, each cylinder may have fitted thereon a piston 13 which is preferably integral with its connecting rod 14. The heads 15 and 16 of each cylinder are preferably removable as shown. Cylinder head 16 carries a boss 17 through which the connecting rod 14 extends, and between the head 16 and piston 13, there is positioned a coil spring 18. The piston 13 is faced with leather 19 against which there is positioned a plate 20. The leather facing 19 extends from the piston 13 to provide a sealing portion 20' which is held against the inner wall of the associated cylinder by a spiral form of spring 21. A plate 22 holds spring 21 in position, and plate 22 together with plate 20 are held against piston 13 by a bolt 23.

Each connecting rod is pivotally attached as at 24 to one end of a brake lever 25, said lever being L-shaped as shown, and having its remaining end pivotally connected as at 26 to one end of the associated brake band 11. The remaining end of each brake band 11 carries a lug 27 through which there is slidable a connecting rod 28, said rod having its one end pivotally connected to the lever 25 as shown at 29. The rod 28 carries a nut 30 and between this nut and lug 27, there is arranged a retractile spring 31. Also the rod 28 carries a nut 32 whereby the brake band 11 may be adjusted. The brake bands may also be adjusted by the usual adjusting set screws indicated at 33.

As shown in Figure 1 the rear brake drums 10' are equipped with an emergency brake of the usual construction. Each drum 10' has arranged within the same an expansion type brake band 35. Each end of the band is pivotally connected to a link 36, said links being connected through a link 37 to a crank arm 38. The crank arms 38 may be operated by a hand lever 39 through shaft 40 and connecting rods 41.

Now referring to Figure 7, the cylinder 43 is bolted or otherwise secured to the frame of the associated motor vehicle and preferably arranged in close relation to the crank shaft 42 of the engine for said motor vehicle. Within the cylinder 43 is piston 44 which is connected to crank shaft 45 through connecting rod 46. The crank shaft 45 is journaled by the walls of cylinder 43, as shown. One end of the crank shaft 45 is formed with a socket 46' adapted to receive one end of a stub shaft 47. The end of shaft 47 projecting into socket 46 is formed with longitudinal ribs which are slidable in grooves formed in the walls of socket 46, and thereby providing a spline connection between the socket and stub shaft.

The engine shaft 42 has a boxing 48 thereabout adapted to retain a lubricant. The shaft 42 carries a bevel gear 49 which is in mesh with a bevel gear 50 carried by a stub shaft 51. The stub shaft 51 has fixed thereon the stationary member 52 of a cone friction clutch, the movable member 53 of said clutch being fixed upon the stub shaft 47.

The cylinder 43 has a head 54 fixed upon one end thereof which carries an intake valve and an outlet valve indicated generally by the reference characters 55 and 56 respectively, Figure 7. As shown in Figure 8 valve 55 is provided by forming a bore 57 in the head 54 adapted to accommodate a valve member 58. The bore 57 is closed at one end by a plug 60 which is formed with a passage 61 adapted to communicate with an orifice 62 formed in the head 54. The remaining end of bore 57 communicates with a passage 63 leading to a nozzle 64, said nozzle being in the form of a strainer as shown. The last named end of bore 57 also communicates with the interior of cylinder 43 through passage 66.

The valve 56 is specifically shown in Figure 9 and as seen for providing this valve, the cylinder head 54 is formed with a second bore 67 which will receive valve member 68. The one end of the bore 67 is closed by a plug 69 and the other end of said bore communicates with the interior of cylinder 43 through passage 70.

The bore 67 of valve 57 communicates with tank 72 through pipe 73. The tank 72 may be secured to the frame of the associated motor vehicle in any suitable manner and preferably positioned as shown in Figure 2. Upon one end of tank 72 there is secured a cylinder 74 which communicates with interior of tank 72 as shown in Figure 10. The cylinder has a piston 75 fitted therein. In the outer end of the cylinder there is threaded a plug 76 through which there is slidable a connecting rod 77. The connecting rod 77 has fixed upon its one end the piston 75 and between the piston and plug 76 there is arranged a coil spring 78. The remaining end of the connecting rod 77 is pivotally connected to a lever bar 79 as at 79', said lever bar being fulcrumed as at 80 and its remaining end provided with a fork 81 which engages a cross pin 82 carried by stub shaft 47.

There is also provided an auxiliary tank 83 which carries upon its one side the valves 84, 85 and 86. These valves are of similar construction. Each valve comprises a housing 87 within which there is fitted a valve member 88. Each valve is held in its raised or closed position by a spring 89. Also each valve is provided with a plunger 90 by which the same may be depressed or brought to its open position.

The interior of casing 87 of valve 84 communicates with the tank 72 through pipe 91. The interior of casing 87 for valve 84 also communicates with tank 83 through pipe 92 and upon the valve member 88 being depressed communication is established between tanks 72 and 83. The interior of casing 87 for valve 85 also communicates with tank 83 through a pipe 94. When valve member 88 of valve 85 is depressed communication is established between tank 83 and a pipe 95. The interior of casing 87 for valve 86 communicates with an exhaust pipe 96, also a pipe 97, and when the valve member 88 of valve 86 is depressed the pipe 97 is open to the atmosphere. As best shown in Figure 2, pipes 95 and 97 are joined and communicate with the brake cylinders 12 of the rear wheels of the vehicle through pipes 98, and with the brake cylinders 12 of the front wheels of the vehicle through the hose couplings 99.

In order to operate the valves 84, 85 and 86, there is provided a shaft 100 which may be supported as shown and which carries an arcuate shaped valve actuating member 101, the ends of which are adapted to operate the valves 84 and 85 with rocking movement of shaft 100. The member 101 also has formed thereon a lug 102 which serves to operate valve 86 when the shaft 100 is rocked in a proper direction. The shaft 100 has fixed to one end thereof a handle 103 and a suitable pawl and ratchet arrangement is provided to hold the handle 103 in adjusted position.

The present apparatus may be used to quickly bring a motor vehicle to a stop. The air compressor including the cylinder 43, etc. should operate to maintain a certain pressure of air in the tank 72. The reciprocation of piston 44 causes air to be pumped into the tank 72 in an apparent manner from the description of the structure of the valves 55 and 56 heretofore given. The cylinder 74, piston 75, spring 78 and connection of piston with stub shaft 47 serve to maintain the desired air pressure in tank 72. The tension of spring 78 can be varied by adjusting plug 76 and thereby adjust the maximum air pressure to be maintained in tank 72.

With compressed air in tank 72, the brakes may be applied upon the different wheels to bring the vehicle to a quick stop by moving the lever 103 forward sufficiently to depress valve member 88 of valve 84 and permit compressed air to enter auxiliary reservoir 83, and then moving the lever 103 rearwardly for opening valve 85. Opening of valve 85 permits air to leave tank 83 and enter brake cylinders 12 through pipes 98 and hose couplings 99. Upon applying the compressed air to the brake cylinders, the pistons 13 will move to apply the brake bands 11 in an apparent manner. When it is desired to release the brakes then the lever 103 should be moved forwardly to a position for opening valve 86. The pipe 95 is now in communication with the atmosphere and the air is exhausted from the brake cylinders. During the last named position of the lever 103, the valve 84 is open and thus permitting the reservoir 83 to become charged with air for the next application of brakes. The brakes for rear wheels operated by rods 41 and lever 39 are usually used when parking the vehicle and can be operated for applying the same in an entirely obvious manner.

What I claim is:

1. A brake apparatus for vehicles comprising, mechanical brakes for the wheels of said vehicle, means whereby said brakes may be operated by compressed fluid, a main reservoir for compressed fluid, means for maintaining compressed fluid in said reservoir, an auxiliary fluid reservoir, means whereby the auxiliary reservoir may be charged with compressed fluid from the main reservoir, and means whereby a charge of compressed fluid in the auxiliary reservoir may be used for operating the brakes of the vehicle.

2. A brake apparatus for vehicles comprising mechanical brakes for the wheels of said vehicle, means whereby said brakes may be operated by compressed fluid, a main reservoir for compressed fluid, means whereby a certain fluid pressure may be maintained in said main air reservoir, an auxiliary air reservoir, connections and valve means whereby the auxiliary reservoir may be charged with compressed fluid from the main reservoir and means whereby a charge of fluid pressure in the auxiliary reservoir is utilized for actuating the brakes.

3. A brake apparatus for vehicles comprising mechanical brake means for each wheel of said vehicle, a cylinder and piston for each wheel, means whereby upon admission of compressed fluid into the cylinders, the pistons will move to apply said brakes, a main reservoir, means whereby compressed fluid may be maintained in said reservoir, an auxiliary compressed fluid reservoir, valve and connections whereby the auxiliary reservoir may be connected with the main reservoir, a supply pipe leading from the auxiliary reservoir to said brake cylinders, and means whereby upon the connection between the main reservoir and auxiliary reservoir being discontinued, communication between the supply pipe and brake cylinders may be established.

4. A brake apparatus for vehicles comprising mechanical brake means for each wheel of said vehicle, a cylinder and piston for each wheel, means whereby upon admission of compressed fluid into the cylinders, the pistons will move to apply said brakes, a main reservoir, means whereby compressed fluid may be maintained in said reservoir, an auxiliary compressed fluid reservoir, valve and connections whereby the auxiliary reservoir may be connected with the main reservoir, a supply pipe leading from the auxiliary reservoir to said brake cylinders, means whereby upon the connection between the main reservoir and auxiliary reservoir being disconnected communication may be established between the auxiliary reservoir and supply pipe, and means whereby during the connection of main reservoir to auxiliary reservoir, the supply pipe is open to the atmosphere.

5. In a brake apparatus of the character described, a reservoir, a valve controlled compressed fluid supply therefor, a valve controlled supply pipe leading from the reservoir, and means for manually operating the valves of said compressed fluid supply and supply pipe whereby neither valve can be opened without the other being closed.

6. In a brake apparatus of the character described, a reservoir, a valve controlled fluid pressure supply for said reservoir, a valve controlled supply pipe for the reservoir, a valve controlled outlet to atmosphere for the supply pipe, and means whereby the valves of the pressure supply and outlet to atmosphere may be simultaneously maintained opened and the valve of supply pipe maintained closed.

7. In a brake apparatus of the character described, a reservoir, a valve controlled fluid pressure supply for said reservoir, a valve controlled supply pipe for the reservoir, a valve controlled outlet to atmosphere for the supply pipe, and means whereby the valves of the pressure supply and outlet to atmosphere may be simultaneously maintained opened and the valve of supply pipe maintained closed, said means being also adapted to permit the valve of pressure supply and valve of outlet to atmosphere to be closed and the valve of supply pipe open.

8. In a brake apparatus, a reservoir, a valve controlled fluid pressure supply for the reservoir, a valve controlled supply pipe for the reservoir, a valve controlled outlet to atmosphere for said supply pipe, and lever means whereby the valve of pressure supply and valve of outlet to atmosphere may be maintained open and the valve of supply pipe closed, or the valve of said pressure supply and valve of said outlet to atmosphere closed and the valve of said supply pipe open.

9. In an apparatus of the character described, an air compressor unit comprising a tank, a cylinder with piston therein, means for reciprocating said piston valve means and connections whereby air may be taken from the atmosphere, compressed, and delivered to the said tank, and a control actuated by the pressure of air in tank whereby with the air pressure reaching a certain degree the reciprocating means for said piston will be discontinued.

10. In an apparatus of the character described, an air compressor unit comprising a tank, a cylinder with piston therein, means for reciprocating said piston valve means and connections whereby air may be taken from the atmosphere, compressed, and delivered to the said tank, a control actuated by the pressure of air in said tank whereby with the air pressure reaching a certain degree the reciprocating means for said piston will be discontinued, and means for adjusting the control for varying the point of air pressure at which the same will operate to stop reciprocation of the piston.

CLARENCE ROSS TROTTER.